(12) United States Patent
Senior

(10) Patent No.: US 12,312,501 B2
(45) Date of Patent: May 27, 2025

(54) METHODS AND BONDING AGENTS FOR FORMING SIMULATED TROPICAL HARDWOOD PANEL

(71) Applicant: Greene Rev LLC, Greensboro, NC (US)

(72) Inventor: Paul D. Senior, Greensboro, NC (US)

(73) Assignee: Greene Rev LLC, Greensboro, NC (US)

( * ) Notice: Subject to any disclaimer, the term of this patent is extended or adjusted under 35 U.S.C. 154(b) by 120 days.

(21) Appl. No.: 18/142,060

(22) Filed: May 2, 2023

(65) Prior Publication Data

US 2024/0368440 A1 Nov. 7, 2024

(51) Int. Cl.
| | | |
|---|---|---|
| C09J 129/04 | (2006.01) | |
| B32B 7/12 | (2006.01) | |
| B32B 21/13 | (2006.01) | |
| B32B 37/06 | (2006.01) | |
| B32B 37/12 | (2006.01) | |

(52) U.S. Cl.
CPC .............. *C09J 129/04* (2013.01); *B32B 7/12* (2013.01); *B32B 21/13* (2013.01); *B32B 37/06* (2013.01); *B32B 37/1207* (2013.01); *B32B 37/1284* (2013.01); *B32B 2255/08* (2013.01); *B32B 2255/26* (2013.01); *B32B 2309/02* (2013.01); *B32B 2309/04* (2013.01)

(58) Field of Classification Search
CPC .......... C09J 129/04; B32B 7/12; B32B 21/13; B32B 37/06
USPC ......................................................... 428/151
See application file for complete search history.

(56) References Cited

U.S. PATENT DOCUMENTS

| | | |
|---|---|---|
| 3,205,111 A | 9/1965 | Williamson et al. |
| 3,312,582 A | 4/1967 | Morris et al. |
| 3,418,195 A | 12/1968 | Morris |
| 3,963,546 A | 6/1976 | Roberti |
| 4,208,369 A | 6/1980 | Kohn |
| 4,388,133 A | 6/1983 | Hirao et al. |
| 4,465,539 A | 8/1984 | Saihara et al. |
| 4,536,427 A | 8/1985 | Kohn |
| 4,731,145 A | 3/1988 | Senzani |
| 4,930,556 A | 6/1990 | Prihoda |
| 4,942,084 A | 7/1990 | Prince |
| 5,015,320 A | 5/1991 | Abendroth et al. |
| 5,040,582 A | 8/1991 | Hsu |
| 5,074,092 A | 12/1991 | Norlander |

(Continued)

FOREIGN PATENT DOCUMENTS

| | | |
|---|---|---|
| EP | 1275481 A2 | 1/2003 |
| SU | 1530449 A1 | 12/1989 |

(Continued)

OTHER PUBLICATIONS

International Search Report and Written Opinion for App. No. PCT/IB2024/053048, dated Jun. 10, 2024, 9 pages.

(Continued)

*Primary Examiner* — Tahseen Khan
(74) *Attorney, Agent, or Firm* — Womble Bond Dickinson (US) LLP

(57) ABSTRACT

A method of forming an engineered veneer block includes stacking a plurality of laminate layers and resistive heating the stack of the plurality of laminate layers to cure an adhesive in the plurality of laminate layers.

20 Claims, 6 Drawing Sheets

(56) References Cited

U.S. PATENT DOCUMENTS

| | | | |
|---|---|---|---|
| 5,098,762 A | 3/1992 | Nakajima | |
| 5,145,537 A | 9/1992 | Senzani | |
| 5,362,520 A | 11/1994 | Rodriguez | |
| 5,418,034 A | 5/1995 | McGuire, III | |
| 5,942,008 A | 8/1999 | Curto | |
| 5,979,524 A | 11/1999 | Trost | |
| 6,298,888 B1 | 10/2001 | Murai | |
| 6,348,119 B1 * | 2/2002 | Leonte | C09J 5/02 |
| | | | 156/275.7 |
| 6,481,476 B1 | 11/2002 | Okamoto | |
| 6,497,937 B1 | 12/2002 | Lam et al. | |
| 6,757,058 B1 | 6/2004 | Carman et al. | |
| 6,888,635 B2 | 5/2005 | Lacovara | |
| 6,913,049 B2 | 7/2005 | Meyer et al. | |
| 7,324,904 B2 | 1/2008 | Floyd et al. | |
| 7,347,912 B2 | 3/2008 | Engel et al. | |
| 8,414,996 B2 | 4/2013 | Senior | |
| 9,242,391 B2 | 1/2016 | Senior | |
| 2002/0031620 A1 | 3/2002 | Yuzawa et al. | |
| 2002/0038482 A1 | 4/2002 | Mennicke et al. | |
| 2007/0102108 A1 | 5/2007 | Zheng et al. | |
| 2007/0137323 A1 | 6/2007 | Floyd et al. | |
| 2007/0289709 A1 | 12/2007 | Chong et al. | |
| 2007/0292656 A1 | 12/2007 | Handojo | |
| 2008/0078473 A1 | 4/2008 | Huang et al. | |
| 2008/0156435 A1 | 7/2008 | Kingma et al. | |

FOREIGN PATENT DOCUMENTS

| | | |
|---|---|---|
| WO | 0066335 A1 | 11/2000 |
| WO | 03084760 A1 | 10/2003 |

OTHER PUBLICATIONS

ASTM E1333—10 Standard Test Method for Determining Formaldehyde Concentrations in Air and Emission Rates from Wood Products Using a Large Chamber, known at least as of Sep. 23, 2010, 6 pgs.
Agnolotti, et al. Adding more value to tropical plywood by innovative products (article), International Tropical Timber Organization, 4 pages, Known at least as early as Sep. 23, 2010.
Material Explorer, description of Alpi Concept and photos of samples, 4 pages, Known at least as early as Sep. 23, 2010.
Material Explorer, description of Alpikord Range 1 and photos of samples, 4 pages, Known at least as early as Sep. 23, 2010.
Material Explorer, description of Alpilignum Bamboo and photos of samples, 4 pages, Known at least as early as Sep. 23, 2010.
Echo Wood: Facts & Specifications (informational handout), 1 page, Known at least as early as Sep. 23, 2010.
Echo Wood (product information and printouts of samples), 3 pages, Known at least as early as Sep. 23, 2010.
Hardwoods Specialty Products (informational chart), 1 page, Known at least as early as Sep. 23, 2010.
Plywood Association of Australia (PAA), Plywood The Only Engineered Wood Panel (informational sheets); 3 pages, Known at least as early as Sep. 23, 2010.
EWPAA, Featuring Plywood in Buildings, article 23, pages, Australia, Known at least as early as Sep. 23, 2010.
Dorries, Formaldehyde Emissions from Plywood and Laminated Veneer Lumber, article, 7 pages, Australia, Known at least as early as Sep. 23, 2010.
Plywood Association of Australia, Ltd., Technical Information, 85 pages, Australia, Known at least as early as Sep. 23, 2010.
EWPAA, Plywood Manufacture: An introduction in the manufacture of plywood, including veneer manufacture, plywood fabrication and LVL, brochure, 11 pages, Known at least as early as Sep. 23, 2010.
EWPAA, Product and Specification Guide for the Professional and Home Handyperson, brochure, 20 pages, Known at least as early as Sep. 23, 2010.

EWPAA, Informational handout on Veneer Manufacture, Plywood Manufacture and Plywood Adhesives, 6 pages, Known at least as early as Sep. 23, 2010.
Greenline, Fineline Veneer Manufacturing Process, brochure, 3 pages, Known at least as early as Sep. 23, 2010.
Greenline, Engineered Wood Veneer and Natural Dyed Wood Veneer, catalog, 12 pages, Known at least as early as Sep. 23, 2010.
Greenline, Cross-Reference Guide, 1 page, Known at least as early as Sep. 23, 2010.
Ipir Reconstituted Wood Veneers—Forest Collection as printed from http://www.greenlineforest.com/pages/reconstituted.html, 29 pages, Known at least as early as Sep. 23, 2010.
Competitiveness of Tropical Timbers at the US Market, general overview, 9 pages, Known at least as early as Sep. 23, 2010.
Ye, Wood Composite Made of Populus Plantation Material in China, technical report, 9 pages, Known at least as early as Sep. 23, 2010.
Criteria for the Measurement of Sustainable Tropical Forest Management, ITTO Policy Development Series No. 3, 8 pages, ITTO, Mar. 25, 1992.
Clausen, et al., Selecting Superior Yellow Birch Trees, guide, 13 pages, U.S.A., Dec. 31, 1967.
Convention on International Trade in Endangered Species of Wild Fauna and Flora, notes from the Second meeting of the Mahogany Working Group Belem (Brazil), Oct. 6-8, 2003, 16 pages, Oct. 8, 2003.
Waverly Council, NSW. The Good Wood Guide: A Residents Guide to Purchasing Environmentally Friendly Timber, 9 pages, Known at least as early as Sep. 23, 2010.
Brown, et al., World View of Plantation Grown Wood, report, 12 pages, Forestry Department, Food and Agriculture Organization of the United Nations (FAO), Viale delle Terme di Caracalla, Rome, Italy, Known at least as early as Sep. 23, 2010.
Castro, et al., Cost Action E44 Final Conference in Milan on: A European Wood Processing Strategy: Future Resources Matching Products and Innovations. Poplar cultivation in Italy: history, state of the art, perspectives, 14 pages, Italy, Known at least as early as Sep. 23, 2010.
A & F Wood Products, Inc., guide and specifications of products, 14 pages, U.S.A., Known at least as early as Sep. 23, 2010.
Website information pages from http://www.alibaba.com/product-free/101370642/Bb.sub.--Cc.sub.--Plywood.s- ub.--Okoume.sub.--Plywood.sub.--Bintangor.sub.--Plywood.sub.--Red.sub.--Ha- rdwood.sub.--Plywood.sub.-- . . . , printed Sep. 1, 2009, 4 pages, Sep. 1, 2009.
Fascination Veneer, brochure, 11 pages, DanzerEuropeVeneer, Known at least as early as Sep. 23, 2010.
Plywood Panel Siding, chapter 4 in Wood: Detailing for Performance, 30 pages, Known at least as early as Sep. 23, 2010.
Cora Lam: HPL laminate with wood decorative surface., brochure, 9 pages, Italy, Known at least as early as Sep. 23, 2010.
Cora Prex: Engineered wood veneer, brochure, 15 pages, Italy, Known at least as early as Sep. 23, 2010.
Vicwood Group: Engineered Wood, 8 pages, Vicwood Development Ltd., Hong Kong, Mar. 22, 2006.
Vicwood Group: Flooring Collection, 12 pages, Vicwood Industry (Suzhou) Co., Ltd., China, Known at least as early as Sep. 23, 2010.
Forest Products Laboratory, Forest Service U.S. Department of Agriculture, Bleaching Wood, research report, 9 pages, Known at least as early as Sep. 23, 2010.
Responsible management of planted forests: Voluntary guidelines; Planted Forests and Tree Working Paper FP37E, 84 pages, Rome, Italy, Known at least as early as Sep. 23, 2010.
Mendoza, et al., Guidelines for Applying Multi-Criteria Analysis to the Assessment of Criteria and Indicators, The Criteria & Indicators Toolbox Series, 82 pages, Center for International Forestry Research (CIFOR), Indonesia, Known at least as early as Dec. 31, 1999.
Unit 1.01.00—Temperate and boreal silviculture, 5 pages, Known at least as early as Sep. 23, 2010.
Ye, Wood Composite Made of Populus Plantation Material in China, general technical report, 9 pages, Known at least as early as Sep. 23, 2010.

(56) References Cited

OTHER PUBLICATIONS

Ipir Reconstituted Wood Veneers—Forest Collection, 29 pages, from http://www.greenlineforest.com/pages/reconstituted.html, Known at least as early as Sep. 23, 2010.
Laminex Timber Veneers, brochure, 15 pages, Known at least as early as Sep. 23, 2010.
Material Explorer, description of Decora and printouts of samples, 4 pages, Known at least as early as Sep. 23, 2010.
Material Explorer, description of Casaleno and printouts of samples, 4 pages, Known at least as early as Sep. 23, 2010.
Material Explorer, description of Mafi Fresco and printouts of samples, 4 pages, Known at least as early as Sep. 23, 2010.
Material Explorer, description of Oval Nimbus and printouts of samples, 4 pages, Known at least as early as Sep. 23, 2010.
Wood and Articles of Wood; Wood Charcoal; Cork and Articles of Cork: Manufacturers of Straw, of Esparto or of Other Plaiting Materials; Basketware and Wickerwood, 31 pages, Known at least as early as Sep. 23, 2010.
Website information pages from http://canply.org/english/products/comparison/comparison.sub.--all.htm, 12 pages, Known at least as early as Sep. 23, 2010.
ALPI Divisione LEGNO, Technical data of Alpilignum decorative multilaminar veneer, compiled Jan. 18, 2008, 3 pages.
Webpage from http://www.alpi.it/uk/Articolo.asp?IdArt=103 showing information on ALPI headquarters, printed on Aug. 26, 2009, 1 page.
Website informational pages from http://www.hardwoods-inc.com/green.sub.--eco.sub.--friendly.aspx about Hardwoods Echo Wood Eco Wood Green Echo-Friendly, Echowood Bamboo and Echowood Wood Veneers, printed Aug. 28, 2009, 10 pages.
Kretschmann, et al., Effect of Various Proportions of Juvenile Wood on Laminated Veneer Lumber, Jul. 1993, 35 pages.
Website information from http://www.faqs.org/rulings/rulings1991HQ0088338.html, printed Sep. 15, 2009, 3 pages.
Busch, The Evolution of the Wood Panel, Interiors & Sources magazine, May 2009, 7 pages.
Peterson, et al., Paper Birch Managers' Handbook for British Columbia, Mar. 1997, 44 pages.
Affre, et al., Looking Under the Veneer, Implementation Manual on EU Timber Trade Control: Focus on Cites—Listed Trees, Mar. 2004, 72 pages, Brussels.
Cites . . . and the Wood Products Trade . . . What you should know, pamphlet, Mar. 2001, 2 pages.
Convention on International Trade in Endangered Species of Wild Fauna and Flora, notes from the Second meeting of the Mahogany Working Group Belem (Brazil), Oct. 6-8, 2003, 3 pages.
Forest Stewardship Council, Controlled Wood, guide, 2007, 8 pages.
Global Forest & Trade Network, Newsletter, Apr. 2009, 12 pages.
WWF Guidelines for Investment in Operations that Impact Forests, Version 1.0, Sep. 2003, 59 pages.
MacQueen, et al., Distinguishing community forest products in the market: Industrial demand for a mechanism that brings together forest certification and fair trade, 2008, 124 pages, International Institute for Environment and Development, United Kingdom.
MacQueen, et al., Exploring fair trade timber: A review of issues in current practice, institutional structures and ways forward, 2006, 120 pages, International Institute for Environment and Development, United Kingdom.
ITTO Action Plan 2008-2011, ITTO Policy Development Series No. 18, 2008, 25 pages, ITTO.
Criteria and Indicators for Sustainable Management of Natural Tropical Forests, ITTO Policy Development Series No. 7, 1998, 28 pages, ITTO.
ITTO Guidelines for the Establishment and Sustainable Management of Planted Tropical Forests, ITTO Policy Development 4, 1993, 44 pages, ITTO.
New Directions for Tropical Plywood: Proceedings of an ITTO/FAO International Conference on Tropical Plywood, Technical Series 26, 2006, 162 pages, ITTO.
Website information pages from http://www2.dpi.qld.gov.au/hardwoodsqld/1816.html, informational guide, printed May 31, 2009, 3 pages.
Wilson, et al., Developing a forest resource on industrial cutaway peatland: The BOGFOR programme, 2008, 192 pages, COFORD, National Council for Forest Research and Development, Dublin, Ireland.
Forest Products Special, various articles, 2005, 109 pages, vol. 5.
Cameron, Managing birch woodlands for the production of quality timber, article, 1996, 1 page, printed from http://forestry.oxfordjournals.org/cgi/content/abstract/69/4/357.
Acker, et al., Cost Action E44 Conference in Milan on: A European Wood Processing Strategy: Future Resources Matching Products and Innovations, May 30 and Jun. 2-3, 2008, 160 pages, Milan, Italy.
Wooden, et al., Lake States Woodlands: Aspen Management, report, 1996, 6 pages, University of Wisconsin System Board of Regents, U.S.A.
Castro, et al., New Technologies and Alternative Uses for Poplar Wood, report, 2006, 10 pages, Italy.
Verani, et al., International Poplar Commission Thematic Papers: Field Handbook—Poplar Harvesting, Working Paper IPC/8, 2008, 60 pages, Forestry Department: Food and Agriculture Organization of the United Nations.
Poplars, Willows and People's Wellbeing: Publications Listed in Country Progress Reports, 23rd Session of the International Poplar Commission, Beijing, China, FAO Working Paper IPC/7, Oct. 2008, 80 pages.
Sanded Plywood, product guide, 1999, 16 pages, APA—The Engineered Wood Association.
Website Information pages from http://www.greenlineforest.com/pages/manufacturing2.html, L4 Natural Dyed Wood Veneers, printed Aug. 27, 2009, 3 pages.
Bleaching (a shortened version of an article published in Ullmann's Encyclopedia of Industrial Chemistry by Wiley-Vch Verlag GmbH & Co. KGaA in 2006, written by Hans Ulrich Suss, Degussa AG, Hanau, Germany), 10 pages.
Mitigation of the UV-driven discolouration of reconstituted and dyed veneers, report, Jan. 2008, 106 pages, project No. PNo7.2036, Forest and Wood Products Australia Limited, Australia.
ITTO Action Plan—Criteria and Priority Areas for Programme Development and Project Work, International Tropical Timber Organization, Ninth Session, Yokohama, Nov. 16-23, 1990, 26 pgs.
Pureview, Huntsman—Enriching Lives Through Innovation, Jul. 2009, 17 pgs.
Utsugi, et al., International Association of Societies of Design Research—The Hong Kong Polytech NIC University, Nov. 12-15, 2007, Visual Character of Board-Formed Environment Consious Materials, 15 pgs.
U.S. Department of Commerce Technology Administration, National Institute of Standards and Technology, Voluntary Product Standard, PS 1-95, Construction and Industrial Plywood, Mar. 1996, 49 pgs.
Smith, et al., Competitiveness of Forest Products at Global Markets' with Particular Emphasis on Tropical Forest Products and on Small and Medium Scale Producers; Market Review in the U.S. of Selected Timber Products, report, Jan. 23, 2008, 38 pages.
ITTO Action Plan 2008-2011, report, 2008, 25 pages, ITTO Policy Development Series No. 18, Japan.
Nussbaum, et al., Modular Implementation and Verification (MIV): a toolkit for the phased application of forest management standards and certification, guide, Nov. 2003, 95 pages, United Kingdom.
North American forest products market crash spreads throughout UNECE region; Green building combats climate change, press release, Oct. 29, 2008, 9 pages, Geneva.
Bull, Plantations: Facts and Figures, presentation, Sep. 9, 2004, 25 pages, Vancouver, Canada.
Watershed: People's Forum on Ecology; periodical; 2004, 60 pages, vol. 9, No. 3 Mar.-Jun. 2004, Towards Ecological Recovery and Regional Alliance (TERRA), Bangkok, Thailand.
White, et al., Responsible Purchasing of Forest Products (second edition), guide, Jul. 2006, 58 pages, WWF International/World Wildlife Fund for Nature.
Focus, magazine, Jul./Aug. 2004, 8 pages, Issue #39, London.

(56) References Cited

OTHER PUBLICATIONS

Practitioner's Guide to the Implementation of the IPF Proposals for Action, Second Revised Edition, May 1999, 94 pages.
Website information pages from http://en.wikipedia.org/wiki/sustainable.sub.--forest.sub.--management, Sustainable forest management, printed Sep. 7, 2009, 17 pages.
Global Forest Resources Assessment Update 2005: Terms and Definitions (final version), Working Paper 83, 2004, 350 pages, Rome, Italy.
Tropical Timber Market Report, 2009, 22 pages, vol. 14, No. 16, ITTO.
United Nations General Assembly, Non-legally binding instrument on all types of forests, Oct. 22, 2007, 10 pages.
Winady, et al., United States Department of Agriculture, Using Wood Composites as a Tool for Sustainable Forestry, Proceedings of Scientific Session 90, XXII IUFRO World Congress, General Technical Report, 2005, 100 pages.
Duke, et al., Biodiversity and Environmental Assessment Toolkit, Mar. 2000, 65 pages.
WWF Guidelines for Investment Operations that Impact Forests, Version 1.0, Sep. 2003, 59 pages.
Website information pages from http://www.acfairbankconsulting.ca/vicwoodfaq.htm, Frequently Asked Questions About Vicwood, printed Aug. 31, 2009, 10 pages.
Daniels, United States Trade in Wood Products, 1978-2005, General Technical Report, May 2008, 67 pages.
Daniels, United States Trade in Wood Products, 1978-2005, General Technical Report, May 2008, 71 pages.
United Nations Conference on Trade and Development, Trade and Development Report: Responding to the Global Crisis, Climate change mitigation and development, 2009, 218 pages, United Nations Publication, New York and Geneva.
Harmonized Tariff Schedule of the United States (2009)—Supplement 1; Wood and Articles of Wood; Wood Charcoal; Cork and Articles of Cork; Manufacturers of Straw, of Esparto or of Other Plaiting Materials; Basketware and Wickerwork, 31 pages.
Wang, The Development of China's Forestry Sector and the Opportunities for Canada, journal, Sep. 2009, 53 pages, Foreign Policy for Canada's Tomorrow, No. 6, Canadian International Council.
Mace, Global Commodity Chains, Alternative Trade and Small-Scale Coffee Production in Oaxaca, Mexico (Masters Thesis), 1998, 42 pages.
Ince, et al., Globalization and World Trade, chapter 13 in Resource and Market Projections for Forest Policy Development, edited by Darius Adams and Richard Haynes, 2007, 31 pages, Springer, The Netherlands.
World Customs Organization, Glossary of International Customs Terms, May 2006, 30 pages, World Customs Organization, Belgium.
Harmonized Tariff Schedule of the United States (2009)—Supplement 1, Effective Feb. 1, 2009; Wood and Articles of Wood; Wood Charcoal; Cork and Articles of Cork; Manufacturers of Straw, of Esparto or of Other Plaiting Materials; Basketware and Wickerwork,31 pages.
The Brussels Definition of Value and The Gatt Valuation Agreement: A Comparison, 42 pages, Feb. 26, 1985, Brussels.
United Nations Conference on Trade and Development, The Feasibility of a Tropical Plywood Futures Contract, Apr. 1, 1998, 63 pages.
US Census Bureau, Hardwood Veneer and Plywood Manufacturing: 2002 Economic Census, Jan. 2005, 46 pages.
Acquah, et al., The Potential for Ghana's Wood/Wood Products in the U.S. Market, May 1998, 140 pages.
Butterworth, et al., GAIN Report: China, Peoples Republic of Solid Wood Products Annual 2005, Jul. 15, 2005, 27 pages.
Achilles, GAIN Report: Germany, Solid Wood Products Annual 2006, Dec. 14, 2006, 23 pages.
Bromokusumo, GAIN Report: Indonesia, Solid Wood Products Annual 2006, Jun. 28, 2006, 14 pages.
Phillips, et al., GAIN Report: Korea, Republic of, Solid Wood Products Annual 2006, Jun. 19, 2006, 33 pages.
Lozano, GAIN Report: Mexico, Solid Wood Products, Mexico Announces Final Rule for Wood Packaging Materials Effective Sep. 16, Feb. 28, 2005, 5 pages.
Leister, GAIN Report: South Africa, Republic of, Exporter Guide Annual Report, Jul. 14, 2005, 21 pages.
AgExporter—The Monthly Magazine for Food and Agricultural Exporters, Apr. 2003, 20 pages.
High-End U.S. Wood Products Make Music . . . and More . . . in Indonesia, AgExporter (magazine), Apr. 2003, 3 pages.
Determination of Wood Panel Uniformity by Means of Optical Sensor Technology, Dr. Herman Van Dyk (Department of Wood and Paper Science), Aditya Ram'Nataraj (Integrated Manufacturing Systems and Engineering Department), known at least as of Sep. 23, 2010, 30 pgs.
Forest Stewardship Council, FSC International Standard, FSC Principles and Criteria for Forest Stewardship, FSC-STD-01-001 (Version 4-0) EN, 1993, 13 pgs.
Forest Stewardship Council, FSC Standard, SLIMF Eligibility Criteria, FSC-STD-01-003 (Version 1-0) EN, Sep. 15, 2004, 5 pgs.
Forest Stewardship Council, FSC Standard, SLIMF Eligibility Criteria—Addendum, FSC-STD-01-003a EN, Feb. 24, 2010, 5 pgs.
Forest Stewardship Council, Structure and Content of Forest Stewardship Standards, FSC-STD-20-002 (Version 2-1), Nov. 30, 2004, 13 pgs.
Forest Stewardship Council, FSC International Standard, Structure, Content and Local Adaptation of Generic Forest Stewardship Standards, FSC-STD-20-002 (V3-0) EN, Aug. 31, 2009, 13 pgs.
Forest Stewardship Council, FSC Standard, Local Adaptation of Certification Body Generic Forest Stewardship Standards, FSC-STD-20-003 (Version 2-1) EN, Nov. 2004, 9 pgs.
Forest Stewardship Council, Forest Pre-evaluation Visits, FSC-STD-20-005 (Version 2-1), Nov. 30, 2004, 4 pgs.
Forest Stewardship Council, Stakeholder Consultation for Forest Evaluation, FSC-STD-20-006 (Version 2-1), Nov. 30, 2004, 7 pgs.
Forest Stewardship Council, FSC International Standard, Stakeholder Consultation for Forest Evaluations, FSC-STD-20-006 (V3-0) EN, Aug. 31, 2009, 12 pgs.
Forest Stewardship Council, FSC Standard, Forest Management Evaluation, FSC-STD-20-007 (Version 2-1) EN, Nov. 30, 2004, 46 pgs.
Forest Stewardship Council, FSC International Standard, Forest Management Evaluations, FSC-STD-20-007 (V3-0) EN, Aug. 31, 2009, 27 pgs.
Forest Stewardship Council, FSC International Standard, Forest Management Evaluations Addendum—Forest Certification Reports, FSC-STD-20-007a (V1-0) EN, Aug. 31, 2009, 14 pgs.
Forest Stewardship Council, FSC International Standard, Forest Management Evaluations Addendum—Forest Certification Public Summary Reports, FSC-STD-20-007b (V1-0) EN, Aug. 31, 2009, 8 pgs.
Forest Stewardship Council, FSC Standard, Forest Certification Reports, FSC-STD-20-008 (Version 2-1) EN, Nov. 30, 2004, 13 pgs.
Forest Stewardship Council, FSC Standard, Forest Certification Public Summary Reports, FSC-STD-20-009 (Version 2-4) EN, Nov. 30, 2004, 7 pgs.
Forest Stewardship Council, FSC Standard, Accreditation Standard for Chain of Custody Evaluations, FSC-STD-20-011 (Version 1-1) EN, Nov. 2007, 34 pgs.
Forest Stewardship Council, FSC Standard, Standard for Evaluation of FSC Controlled Wood in Forest Management Enterprises, FSC-STD-20-012 (Version 1-1) EN, Mar. 2007, 18 pgs.
Forest Stewardship Council, FSC Standard for Group Entities in Forest Management Groups, FSC-STD-30-005 (V1-0 Draft 2-0), May 5, 2009, 14 pgs.
Forest Stewardship Council, FSC Standard, FSC Controlled Wood Standard for Forest Management Enterprises, FSC-STD-30-010 (Version 2-0) EN, Oct. 4, 2006, 16 pgs.
Forest Stewardship Council, FSC Standard, Standard for Multi-site Certification of Chain of Custody Operations, FSC-STD-40-003 (Version 1-0) EN, Jun. 2007, 12 pgs.

(56) References Cited

OTHER PUBLICATIONS

Forest Stewardship Council, FSC Standard FSC Standard for Chain of Custody Certification, FSC-STD-40-004 (Version 2-0) EN, Nov. 2007, 26 pgs.
Forest Stewardship Council, Addendum to FSC Standards FSC-STD-40-004, FSC Product Classification, FSC-STD-40-004a (Version 1-0) EN, Dec. 20, 2007, 16 pgs.
Forest Stewardship Council, Addendum to FSC Standard FSC-STD-40-004, FSC Species Terminology FSC-STD-40-004b (Version 1-0) EN, Dec. 20, 2007, 25 pgs.
Forest Stewardship Council, FSC Standard, Standard for Company Evaluation of FSC Controlled Wood, FSC-STD-40-005 (Version 2-1) EN, Oct. 4, 2006, 28 pgs.
Forest Stewardship Council, FSC Standard, FSC Chain of Custody Standard for Project Certification, FSC-STD-40-006 (Version 1-0) EN, Jun. 2006, 19 pgs.
Forest Stewardship Council, FSC Standard, FSC Standard for Sourcing Reclaimed Material for Use in FSC Product Groups or FSC-certified Projects, FSC-STD-40-007 (Version 1-0) EN, Nov. 2007, 8 pgs.
Formaldehyde Emissions—Understanding the standards. Paper by Stephen Young, May 2004, 4 pgs.
Website informational pages from http://www.alpi.it/uk/Articolo.asp?IdArt=118 about the Alpilignum Production Process, printed on Aug. 26, 2009, 2 pages.
Website informational pages from http://www.alpi.it/uk/dovesiamo.asp on how to contact ALPI headquarters in Modigliana, Italy, printed Aug. 26, 2009, 2 pages.
Echo Wood Reconstituted Real Wood Veneer Specification Sheet (general informational handout), Sep. 2008, 5 pages.
Website informational pages from http://www.hardwoods-inc.com/products.aspx?subnav=Id7-ef818af20b7b about Hardwoods Hardwoods Dragon Ply Echowood Rely-A-Form Hardwood Lumber Plywood Overlay Products, printed Aug. 28, 2009, 6 pages.
Hardwood Plywood Handbook, handbook, 2004, 70 pages, Hardwood Plywood Veneer Association, USA.
Veneer Species Guide, handbook, 2006, 79 pages, Hardwood Plywood Veneer Association, USA.
American National Standard for Hardwood and Decorative Plywood, handbook, 2004, 54 pages, Hardwood Plywood & Veneer Association, USA.
Voluntary Standard for Sliced Decorative Wood Face Veneer, informational guide, original publication date Jan. 5, 1996, 13 pages, Hardwood Plywood & Veneer Association, USA.
Castro, et al., Multilaminar wood: Manufacturing process and main physical-mechanical properties, article in Forest Products Journal, 2004, 7 pages, vol. 54, No. 2, Forest Products Society.
Website informational pages from Greenline, How to Specify Greenline Fineline Reconstituted Wood Veneers, printed Aug. 26, 2009, 2 pages.
Website information pages from http://www.greenlineforest.com/pages/reconstituted.html, printed Aug. 27, 2009, 3 pages.
Website information pages from http://www.greenlineforest.com/pages/specify.sub.--veneers2.html, How to Specify Greenline L4 Natural Dyed Veneers, printed Aug. 27, 2009, 2 pages.
Website information pages from http://www.greenlineforest.com/pages/specify.sub.--veneers.html, How to Specify Greenline Fineline Reconstituted Wood Veneers, printed Aug. 27, 2009, 2 pages.
Website information pages from http://www.greenlineforest.com/pages/sustainable2.html, An Endangered Earth, printed Aug. 27, 2009, 2 pages.
Website information pages from http://www.greenlineforest.com/pages/technical.html, Greenline L4 Natural Dyed Wood Veneers, printed Aug. 27, 2009, 2 pages.
Website information pages from http://www.greenlineforest.com/pages/veneer.sub.--intro.html, printed Aug. 27, 2009, 2 pages.
Website information pages from http://www.blueridgesales.ca/qs/page/5672/5666/-1, Manufacturers Agent of Premium Wood Products, printed Aug. 26, 2009, 8 pages.
Website information pages from http://www.greenlineforest.com/pages/sustainable.htm, An Endangered Earth, printed Aug. 27, 2009, 2 pages.
Ipir, Source and Supply of Sustainable Raw Material, letter, Sep. 27, 2006, 1 page.
Winandy, et al., United States Department of Agriculture, Using Wood Composites as a Tool for Sustainable Forestry, Proceedings of Scientific Session 90, XXII IUFRO World Congress, General Technical Report, 2005, 97 pages.
Chunquan, et al., China's Wood Market, Trade and the Environment, report, 2004, 81 pages, Science Press USA Inc. and WWF International, Beijing, China.
Kun, et al., Demand and Supply of Wood Products in China, report, 2007, 77 pages, Food and Agriculture Organization of the United Nations, Rome, Italy.
FSC Standard: FSC Chain of Custody Standard for Companies Supplying and Manufacturing FSC-Certified Products, 2004, 28 pages, Forest Stewardship Council, A.C., Bonn, Germany.
FSC Principles and Criteria for Forest Stewardship, 2004, 11 pages, Forest Stewardship Council, A.C.
Hain, et al., FSC Group Certification Toolkit, 2005, 77 pages.
Evans, et al., Guide to Participatory Tools for Forest Communities, 2006, 43 pages, Center for International Forestry Research, Indonesia.
Stewart, et al., Good practice guidelines for High Conservation Value assessments: A practical guide for practitioners and auditors, 2008, 48 pages, ProForest, United Kingdom.
Website information pages from http://www2.ffpri.affrc.go.jp/fdb/esawoodq/Def.html, Definition of Properties, printed Sep. 7, 2009, 3 pages.
European Search Report for EP Application No. 10190174.2, dated Nov. 20, 2013, 9 pgs.
Ye, Wood Composite Made of Populus Plantation Material in China, technical report, 9 pages, known at least as early as Apr. 22, 2010.
Waverley Council, NSW, The Good Wood Guide: A Residents Guide to Purchasing Environmentally Friendly Timber, 9 pages, known at least as early as Sep. 28, 2010.
Website information pages from http://www.alibaba.com/product-free/101370642/Bb-Cc-Plywood-Okoume-Plywood-Bintangor-Plywood-Red-Hardwood-Plywood- . . . , printed Sep. 1, 2009, 4 pages, Sep. 1, 2009.
Core Prex: Engineered wood veneer, brochure, 15 pages, Italy, known at least as early as Sep. 23, 2010.
Website informational pages from http://www.hardwoods-inc.com/green-eco-friendly.aspx about Hardwoods Echo Wood Eco Wood Green Echo-Friendly, Echowood Bamboo and Echo-wood Wood Veneers, printed Aug. 28, 2009, 10 pages.
Website informational pages from http://www.hardwoods-inc.com/products.aspx?subnav=Id7-ef818af20b7b about Hardwoods Hardwoods Dragon Ply Echowood Rely-A-Form Hardwood Lumber Plywood Overylay Products, printed Aug. 28, 2009, 6 pages.
Plywood Association of Australia (PAA), Plywood 'The Only Engineered Wood Panel' (informational sheets); 3 pages, known as early as Sep. 23, 2010.
Greenline, Fineline Veneer Manufacturing Process, brochure, 3 pages, know at least as early as Sep. 23, 2010.
Website information pages from http://www.greenlineforest.com/pages/specify-veneers2.html, How to Specify Greenline L4 Natural Dyed Veneers, printed Aug. 27, 2009, 2 pages.
Website information pages from http://www.greenlineforest.com/pages/specify-veneers.html, How to Specify Greenline Fineline Reconstituted Wood Veneers, printed Aug. 27, 2009, 2 pages.
Website information pages from http://www.greenlineforest.com/pages/veneer-intro.html, printed Aug. 27, 2009, 2 pages.
Website information pages from http://en.wikipedia.org/wiki/sustainable-forest-management, Sustainable forest management, printed Sep. 7, 2009, 6 pages.
Mendoza, et al., Guidelines for Applying Multi-Criteria Analysis to the Assessment of Criteria and Indicators, The Criteria & Indicators Toolbox Series, 82 pages, Center for International Forestry Research (CIFOR), Indonesia, know at least as early as Sep. 23, 2010.
LamInex Timber Veneers, brochure, 15 pages, know at least as early as Sep. 23, 2010.

(56) References Cited

OTHER PUBLICATIONS

Material Explorer, description of Oval Nimbus and printouts of samples, 4 pages, known at least as early as Sep. 22, 2010.

Wood and Articles of Wood; Wood Charcoal; Cork and Articles of Cork; Manufacturers of Straw, of Esparto or of Other Plaiting Materials; Basketware and Wickerwork, 24 pages, known at least as early as Sep. 23, 2010.

Website information pages from http://www.canply.org/english/products/comparison/comparison-all.htm, 12 pages, known at least as early as Sep. 23, 2010.

\* cited by examiner

METHODS AND BONDING AGENTS FOR FORMING SIMULATED TROPICAL HARDWOOD PANEL

BACKGROUND

1. Technical Field

The present disclosure relates to simulated hardwood panels and, more specifically, to methods and bonding agents for forming simulated tropical hardwood panels.

2. Discussion of Related Art

Some plywood panels used in the construction industry, furniture industry, cabinet industry, and the like commonly include one or more plies of tropical hardwoods. One example of such a plywood panel is Lauan plywood. Lauan plywood is typically used for non-decorative applications such as flooring underlayment, internal or hidden portions of furniture and cabinetry, and the like. Lauan plywood and similar plywoods are a commodity product sold by lumber supply wholesalers and retailers. Traditionally, Lauan plywood panels and other similar plywood panels include one or more tropical hardwood plies produced from wood harvested from tropical forests located in tropical regions such as Indonesia and Malaysia. Such tropical forests have become increasingly vulnerable to the adverse consequences of environmentally destructive tree harvesting practices. Such harvesting practices can lead to severe soil erosion, increased incidents of illegal logging, and poor soil fertility, for example.

For these reasons, substantial efforts are being made to significantly reduce or eliminate the importation and sale of products that contain tropical hardwoods harvested from endangered tropical forests. In particular, there is a demand for substitute wood products that include little or no wood from endangered tropical forests, and instead include wood from sustainable sources of wood (the term "sustainable source(s) of wood" is defined below). Accordingly, there is a need for hardwood plywood panels that include no tropical hardwoods from endangered tropical forests and instead include wood from one or more sustainable sources of wood. More specifically, there is a need for a simulated commodity tropical hardwood-based panel that includes no tropical hardwood from non-sustainable wood sources, yet has the visual appearance of the tropical hardwood panel that it replaces. Purchasers and users of such a simulated commodity tropical hardwood-based panel may have difficulty differentiating between the simulated commodity tropical hardwood-based panel and a commodity tropical hardwood-based panel that it replaces.

SUMMARY

In an embodiment of the present disclosure, a method of forming an engineered veneer block includes stacking a plurality of laminate layers and resistive heating the stack of the plurality of laminate layers to cure an adhesive in the plurality of laminate layers.

In embodiments, resistive heating the stack of the plurality of laminate layers includes passing electrical energy through the stack of the plurality of laminate layers to heat the stack to a temperature in a range of 36 degrees Celsius to 40 degrees Celsius. Resistive heating may include maintain the temperature in a range of 36 degrees Celsius to 40 degrees Celsius in a range of 3 to 6 days.

In other embodiments, resistive heating the stack of the plurality of laminate layers includes contacting the topmost surface of the plurality of laminate layers with a first conductor, contacting a bottommost surface of the plurality of laminate layers with a second conductor, and providing electrical energy to at least one of the first conductor or the second conductor such that electrical energy passes through the stack of the plurality of laminate layers between the first conductor and the second conductor. The electrical energy may be direct current or alternating current.

In certain embodiments, the method includes spreading a bonding agent on one or more of the plurality of laminate layers before stacking the plurality of laminate layers. The method may include cold pressing the plurality of laminate layers before resistive heating the stack of the plurality of laminate layers. The method may include mixing the bonding agent before spreading the bonding agent on the one or more of the plurality of laminate layers. Mixing the bonding agent may include determining an among of water in the bonding agent based on a moisture content of the plurality of laminate layers.

In particular embodiments, mixing the bonding agent includes mixing a permeating agent with the adhesive. The permeating agent may improve permeation of the adhesive and moisture into the plurality of laminate layers. Mixing the bonding agent may include adding an adhesive having greater than 16 percent Urea. Mixing the bonding agent may include adding an adhesive having 50 percent or less water. Mixing the bonding agent may include adding an adhesive having less than 31 percent formaldehyde.

In another embodiment of the present disclosure, a bonding agent for forming an engineered veneer block includes an adhesive and a permeating ageing. The permeating agent is configured to improve permeation of the adhesive and moisture through wood.

In embodiments, the permeating agent includes 35 percent or more of polyvinyl alcohol and 15 percent or more vinyl acetate. The adhesive may include less than 331 percent formaldehyde. The adhesive may include greater than 16 percent Urea. The adhesive may include 50 percent or less water. The bonding agent may include water based on the moisture content of wood to be bonded.

In another embodiment of the present disclosure, an engineered veneer includes a plurality of strips of laminate layers and a cured bonding agent bonding the plurality of strips of the laminate layers together to form the engineered veneer. The engineered veneer emitting less than 0.15 parts per million formaldehyde as measured by EPA Method 323—Formaldehyde Measurement Using Derivatization.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
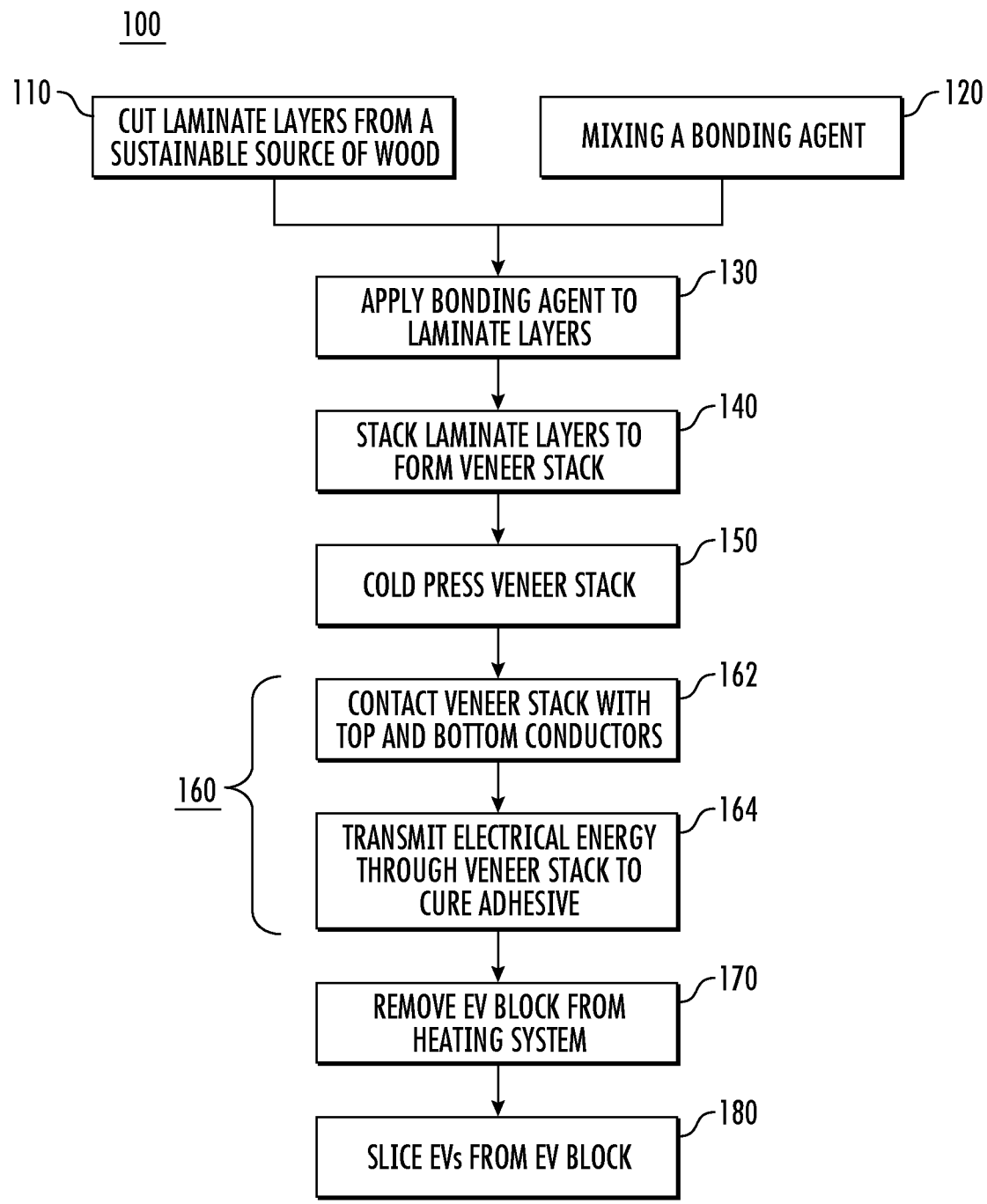
FIG. 1 is a flowchart of a method of forming an Engineered Veneer provided in accordance with the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

This disclosure relates to the forming an Engineered Veneer (EV) Block with a plurality of laminate layers that are stacked and adhered to one another. The EV Block is then sliced to form an EV that simulates a tropical hardwood such as Lauan. The EV Block may be sliced at an angle relative to the laminate layers. In some embodiments, the EV Block may be sliced perpendicular to the laminate layers, plain sliced, or sliced at a variety of angles to obtain a desired appearance of the EV. The EV may include a thin segment of each of the plurality of laminate layers. The EV may bond to a panel core such that the panel simulates a tropical hardwood panel.

Figure 2:
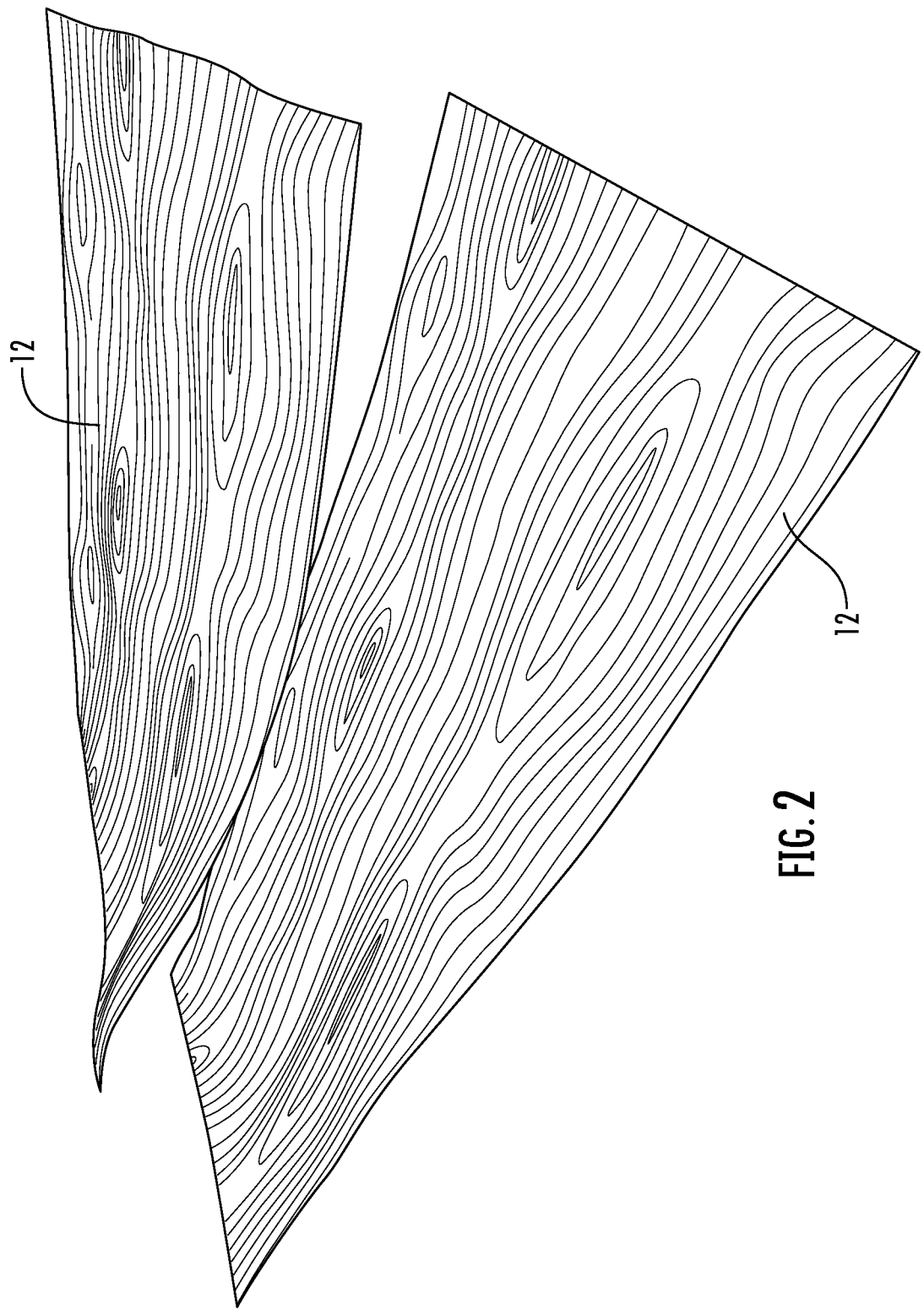
FIG. 2 is a perspective view of laminate layers.

Referring to FIGS. 1-6, a method 100 of forming an Engineered Veneer (EV) block 10 is described in accordance with the present disclosure. The EV block is formed by a plurality of laminate layers 12 that are stacked and bonded together with one or more adhesives. The laminate layers 12 are each thin slices of a sustainable source of wood. The laminate layers 12 may be from a single source of wood or may be from multiple sources or types of wood that are stacked and bonded to form the EV block as detailed below. The method 100 may include cutting the laminate layers 12 from the source or sources of wood (Step 110). The laminate layers 12 may be in a range of 0.5 mm to 1.5 mm thick as shown in FIG. 2.

The method 100 includes mixing a bonding agent to bond the laminate layers 12 together (Step 120). The bonding agent may include water, an adhesive, and a permeating agent. The permeating agent may assist the adhesive and moisture in permeating through the wood of the laminate layers 12. The bonding agent may include significantly less water than previous bonding agents. In some embodiments, the bonding agent may include added water. Mixing the bonding agent may include pouring the components of the bonding agent into a stirring machine and stirring the components until the components are evenly and completely mixed. The bonding agent may be stirred at room temperature. The bonding agent may be stirred in a range of 10 to 20 minutes to mix the bonding agent.

Figure 3:
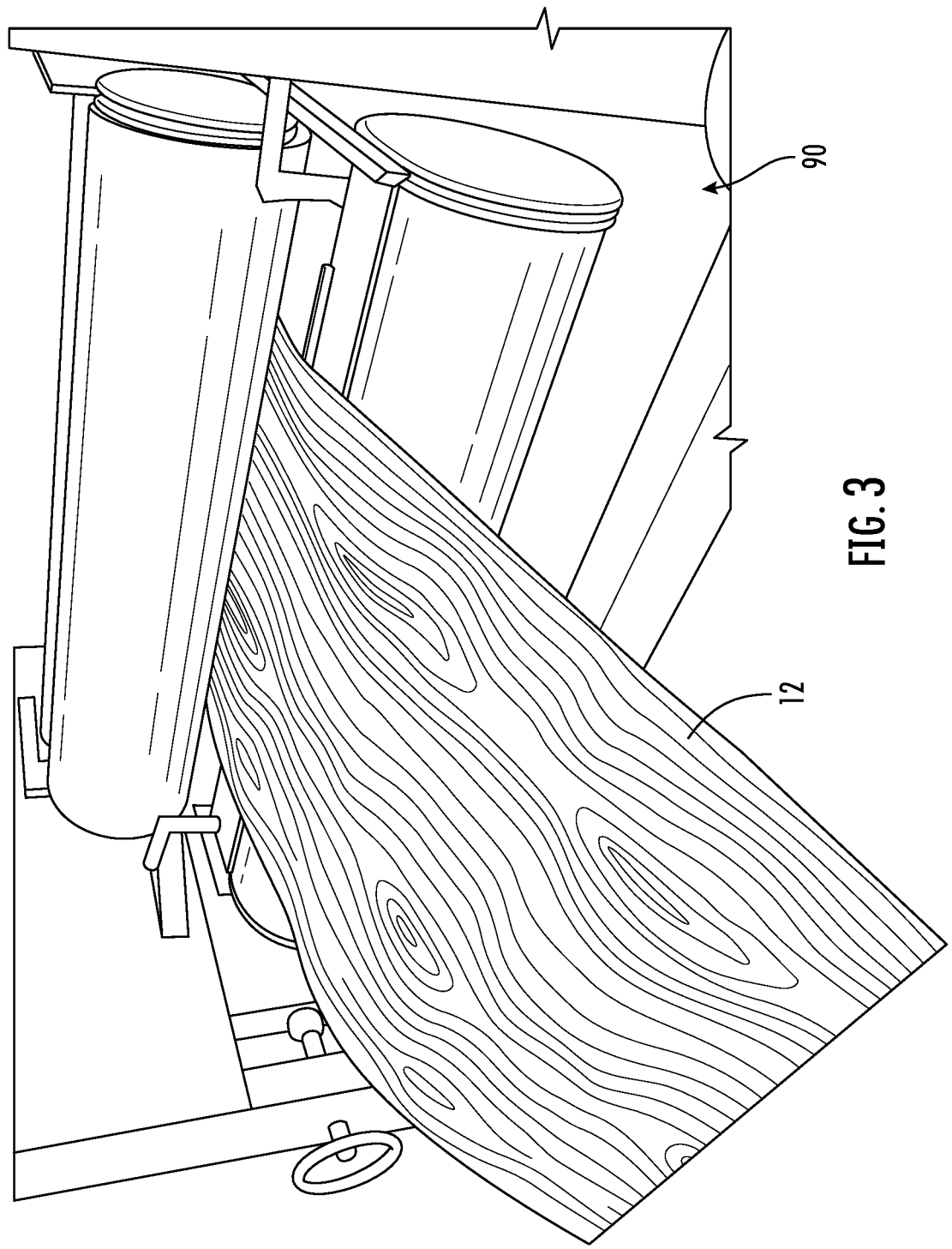
FIG. 3 is a perspective view of a laminate layer with a bonding agent applied thereto.

When the bonding agent is mixed and the laminate layers 12 are cut, the bonding agent is applied to the laminate layers 12 (Step 130). The bonding agent may be applied to the laminate layers 12 by loading a spreading machine 90 with the bonding agent and passing one or more of the laminate layers 12 through the spreading machine 90 as shown in FIG. 3. Each laminate layer 12 may be passed through the spreading machine 90 to have the bonding agent applied thereto.

Figure 4:
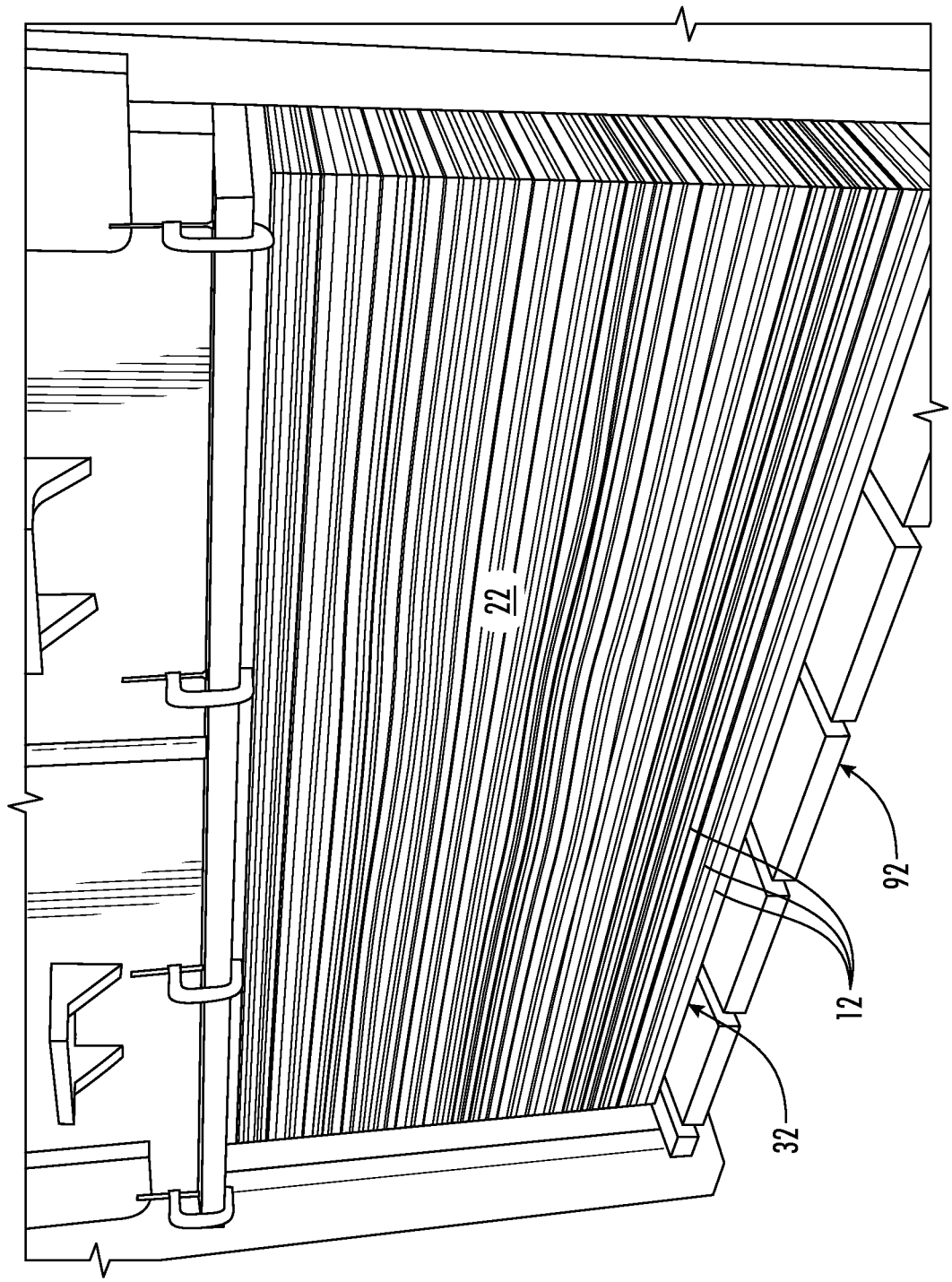
FIG. 4 is a perspective view of a stack of laminate layers in a cold pressing machine.

As the laminate layers 12 are passed through the spreading machine 90, the laminate layers 12 are stacked on top of one another to form a veneer stack 22 as shown in FIG. 4 (Step 140). In embodiments where every layer is passed through the spreading machine 90, the laminate layers 12 may be stacked as each layer comes out of the spreading machine 90. In some embodiments, the bonding agent permeates through the laminate layers 12. In certain embodiments, the laminate layers 12 may be inspected for damage and repaired or discarded before being placed in the veneer stack 22 or passed through the spreading machine 90.

The laminate layers 12 are stacked until the veneer stack 22 reaches a desired thickness for the EV block 32. For example, each laminate layer 12 may have a length in a range of 2500 mm (98 inches) to 2600 mm (102 inches), e.g., 2560 mm (100 inches), a width in a range of 680 mm (26.5 inches) to 760 mm (30 inches), e.g., 720 mm (28 inches), and a thickness in a range of 0.85 mm (0.033 inches) to 1 mm (0.04 inches). The veneer stack 22 may include a range of 1600 to 1900 laminate layers 12 such that the veneer stack 22 has a total height in a range of 1200 mm (47 inches) to 1400 mm (55 inches), e.g., 1300 mm (51 inches).

With particular reference to FIG. 3, with the veneer stack 22 formed, the veneer stack 22 is placed in a cold pressing machine 92. In some embodiments, the laminate layers 12 are stacked in the cold pressing machine 92. The cold pressing machine 92 is activated to press the veneer stack 22 to compress the laminate layers 12 together and allow the bonding agent to permeate through all of the laminate layers 12 (Step 150). The cold pressing machine 92 may apply a range of 800 kilopascals (kPa) to 5000 kPA to compress the laminate layers 12 in a range of 3 to 6 hours, e.g., 4 to 5 hours.

Figure 5:
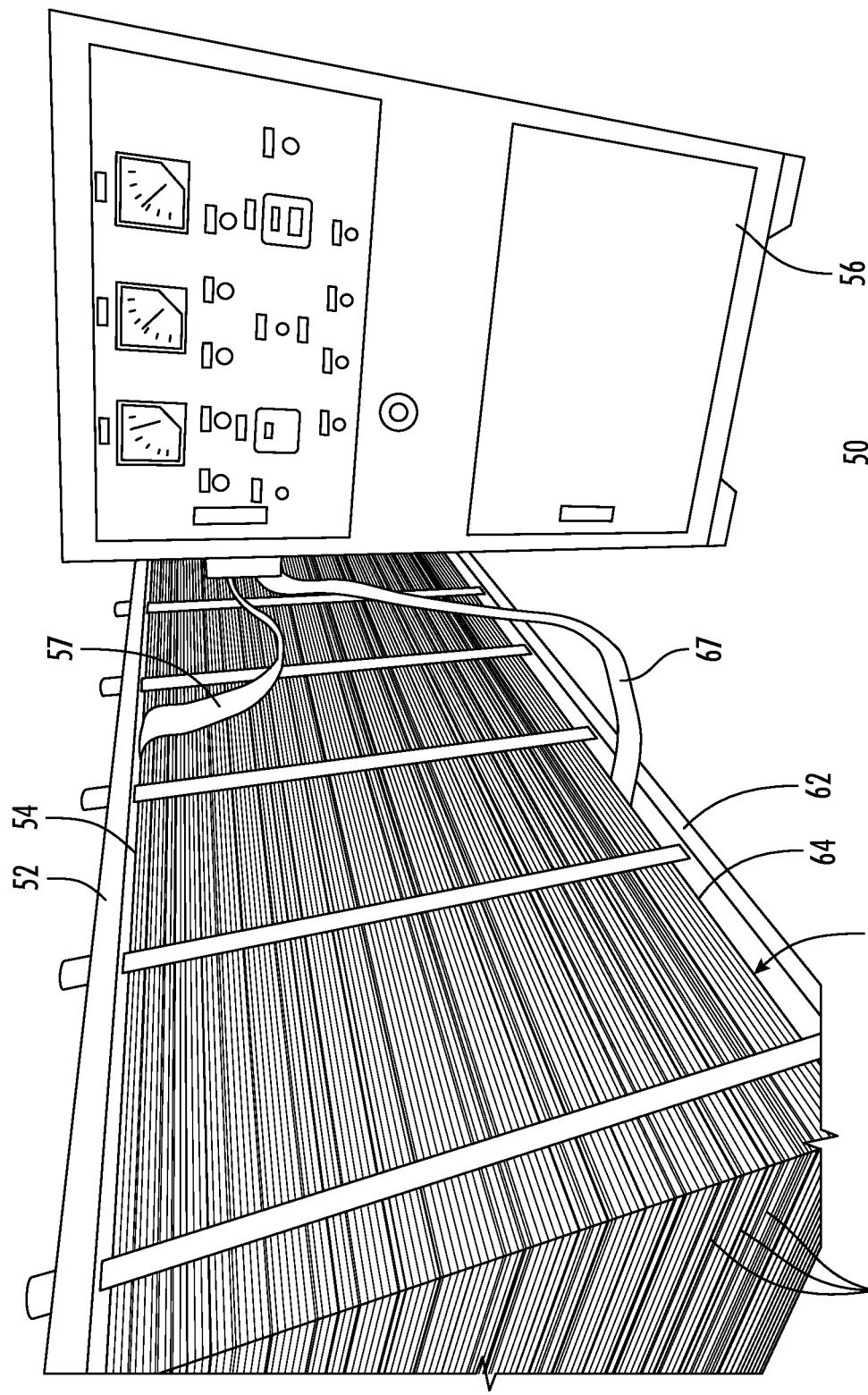
FIG. 5 is a perspective view of the stack of laminate layers in a heating system.
Figure 6:
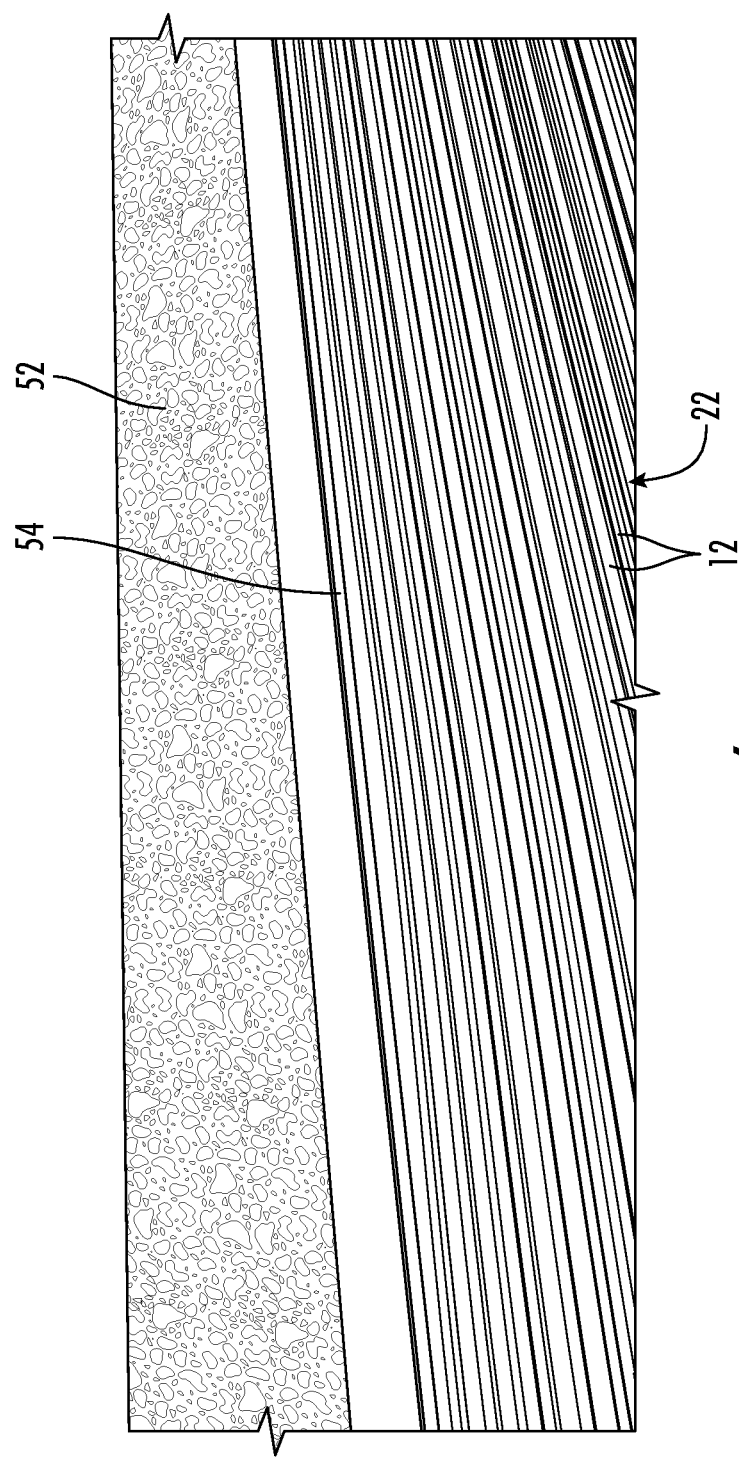
FIG. 6 is an enlarged view of the stack of laminate layers of FIG. 5.

Referring now to FIGS. 5 and 6, the compressed veneer stack 22 placed in a heating system 50 which is provided in accordance with the present disclosure. The heating system 50 is used to heat the veneer stack 22 to cure the adhesive in the bonding agent (Step 160). The heating system 50 includes a top insulator 52 and a bottom insulator 62. The insulators 52, 62 may be formed of concrete, cement, rubber, wood, composite, or a combination of materials. In some embodiments, the insulators 52, 62 are formed of multiple materials which may include a conductive material and an insulative material. For example, one or both of the insulators 52, 62 may include a metal base (steel, lead, or stainless steel) and an insulative coating (rubber, polymer, or wood) facing the veneer stack 22. The heating system 50 also includes a top conductor 54 in contact with the topmost laminate layer 12 and a bottom conductor 54 in contact with the bottommost laminate layer 12. The conductors 54, 64 may be a sheet that is in contact with the entire top or bottom surface of the respective laminate layer 12. The conductors 54, 64 may be formed of a variety of highly conductive materials such as aluminum, silver, copper, or gold. For example, the conductors 54, 64 may be aluminum sheets. The conductors 54, 64 may have a thickness of 2.5 mm. In certain embodiments, the conductors 54, 64 may be formed as part of the insulators 52, 62 such that the conductors 54, 64 are secured to the insulators 52, 62 in opposition to one another with the veneer stack 22 disposed therebetween.

The heating system 50 includes a power source 56 that is in electrical communication with the top conductor 54 and the bottom conductor 64. The power source 56 may be in electrical communication with the top conductor 54 and the bottom conductor 64 by a top wire belt 57 and a lower wire belt 67 that are each connected to a respective one of the top conductor 54 and the bottom conductor 64. The top wire belt 57 and the lower wire belt 67 may include a plurality of connectors that connect to multiple locations along the edges of the respective top conductor 54 or the bottom conductor 64 to electrically couple to the conductors 54, 64, Connecting to multiple locations on the conductors 54, 64 may improve a distribution energy across the surface of the conductors 54, 64 in contact with the veneer stack 22.

With veneer stack 22 placed in the heating system 50, the top conductor 54 and bottom conductor 64 are placed in contact with the topmost and bottom most surfaces, respectively, of the veneer stack 22 (Step 162). With the conductors 54, 64 in contact with the surfaces of the veneer stack 22, the heating system 50 is activated to transmit electrical energy through the veneer stack 22 to heat the veneer stack 22 (Step 164). The veneer stack 22 may act as a resistor in between the conductors 54, 64 such that the veneer stack 22 is heated by resistive heating. In embodiments, the power source 56 provides electrical energy in the form of direct current with one of the conductors 54, 64 acting as an anode and the other of the conductors 54, 64 acting as a cathode. In some embodiments, the power source 56 provides electrical energy in the form of alternating current with one of the conductors 54, 64 acting as an anode/cathode and the other of the conductors 54, 64 acting as the ground. The power source 56 may provide electrical energy sufficient to heat the veneer stack 22 to a temperature in a range of 36 degrees Celsius to 40 degrees Celsius, e.g., 38 degrees Celsius. The temperature of the veneer stack 22 may be measured by one or more sensors disposed on, in, or about the veneer stack 22. In some embodiments, the temperature of the veneer stack 22 may be calculated based at least partially on an amount of power provided by the power source 56. The temperature of the veneer stack 22 is maintained for a predetermined amount of time to fully cure the adhesive of the bonding agent. The predetermined amount of time may in a range of 3 to 6 days, e.g., 4 to 5 days. The top and/or bottom conductors 54, 64 may apply pressure to the veneer stack 22 while the veneer stack 22 is heated.

After the predetermined amount of time, the veneer stack 22 forms the EV block 32. When the EV block 32 is formed, the EV block 32 is removed from the heating system 50 (Step 170). The EV block 32 is then sliced into an EV (Step 180). Each EV may include strip of substantially all of the laminate layers 22 of the EV block 32. Each EV may be sized to form the surface of a layered building material, e.g., plywood, such that the layered building material resembles a tropical hardwood panel but is formed of sustainable wood sources, e.g., Lauan.

The method 100 detailed above includes heating the veneer stack 22 by resistive heating. This is an improvement over the traditional heating of veneer stacks 22 by placing the veneer stack 22 in a steam kiln. Using resistive heating to heat the veneer stack 22 may use less energy than heating a steam kiln. Using resistive heating may quickly heat the entire veneer stack 22 evenly. In contrast, it may take a long time for heat of a steam kiln to penetrate the entire veneer stack 22. Heating the veneer stack 22 with resistive heating may reduce the time required to cure the adhesive. Specifically, it may take 8 to 9 days in a steam kiln to cure adhesive in a veneer stack 22 compared to 3 to 6 days using resistive heating. Evenly curing the adhesive may decrease failures when slicing the EV block 32.

The bonding agent used in the method 100 detailed above, may be an improvement over previous bonding agents. For example, previous bonding agents may include polyvinyl acetate, adhesive, and water. The previous bonding agents could be hard to control and difficult to cure. The previous bonding agents could cause the EV block to fall apart or split when sliced. The previous bonding agents could create a rigid EV block that is difficult to slice and/or create a rough surface when the EV block is sliced.

The bonding agent for the EV block may include less water than previous bonding agents. In some embodiments, the formulation of the bonding agent may be based on the moisture content (MC) of the laminate layers 12. In certain embodiments, the bonding agent may not include any water. The bonding agent may include a permeating agent to permeate through the wood of the laminate layers 12. The permeating agent may include vinyl acetate and polyvinyl alcohol as major components thereof. In particular embodiments, the permeating agent may be formulated to include 35 percent or more percent polyvinyl alcohol, e.g., 35, 40, 45, or 50 percent, and 15 percent or more vinyl acetate, e.g., 15, 20, 25, or 30 percent. In some embodiments, the permeating agent may include propylene glycol, unsaturated polyester resin, and/or water. In certain embodiments, the permeating agent includes 10 percent or less water.

The bonding agent may be formulated to include the permeating agent in a range of 0.7 to 1 percent, water in a range of 0 to 3 percent, and adhesive in a range of 96 to 99 percent. The improved bonding agent may allow the adhesive and/or moisture permeate the wood better than previous bonding agents. In some embodiments, the bonding agent may make the finished EV block 32 more flexible and/or more suitable for slicing than previous bonding agents.

As detailed above, the bonding agent used in method 100 may be improved by the inclusion of the permeating agent. In addition to improving the bonding agent, the method 100 may use an improved adhesive. Specifically, the improved adhesive may decrease emission of formaldehyde from the final engineered veneer. For example, the first and second adhesives disclosed herein may emit of less than 0.15 ppm or 0.05 ppm as measured using EPA Method 323—Formaldehyde Measurement Using Derivatization. In contrast, veneers made with the previous adhesives may emit less than 0.5 ppm formaldehyde or three to ten times as much formaldehyde. The formulation of the adhesives may be as follows:

| Component | Previous Adhesive | First Adhesive | Second Adhesive |
|---|---|---|---|
| Urea | 2.10% | 16.67% | 23.32% |
| Formaldehyde | 40.68% | 30.95% | 29.15% |

| Component | Previous Adhesive | First Adhesive | Second Adhesive |
|---|---|---|---|
| melamine | 0.00% | 2.14% | 2.19% |
| ammonium hydroxide | 2.17% | 0.00% | 0.00% |
| polyvinyl alcohol | 0.05% | 0.24% | 0.34% |
| water | 55.00% | 50.00% | 45.00% |

As shown in the table above, the amount of formaldehyde is reduced from the previous adhesives to the first adhesive and further to the second adhesive. Specifically, the first and second adhesives have less than 31 percent formaldehyde. In addition, the table shows that increasing the Urea in the adhesive may reduce formaldehyde emissions from the adhesive. Specifically, the first adhesive and the second adhesive may include greater than 16 percent Urea. Further, the table shows that the first and second adhesive are free of ammonium hydroxide and both include melamine. The first and second adhesives may include 50 percent or less of water.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A method of forming an engineered veneer block, the method comprising:
   stacking a plurality of laminate layers to form a veneer stack, the plurality of laminate layers including a topmost laminate layer and a bottommost laminate layer opposite the topmost laminate layer;
   contacting a topmost surface of the topmost laminate layer with a first conductor, the first conductor in contact with the entire topmost surface;
   contacting a bottommost surface of the bottommost laminate layer with a second conductor, the second conductor in contact with the entire bottommost surface; and
   resistive heating the veneer stack to cure an adhesive in the plurality of laminate layers by transmitting electrical energy between the first conductor and the second conductor through an entire thickness of each laminate layer of the plurality of laminate layers.

2. The method according to claim 1, wherein resistive heating the stack of the plurality of laminate layers includes passing electrical energy through the stack of the plurality of laminate layers to heat the stack to a temperature in a range of 36 degrees Celsius to 40 degrees Celsius.

3. The method according to claim 2, wherein resistive heating includes maintaining the temperature in a range of 36 degrees Celsius to 40 degrees Celsius in a range of 3 to 6 days.

4. The method according to claim 1, wherein the electrical energy is direct current.

5. The method according to claim 1, further comprising spreading a bonding agent on one or more of the plurality of laminate layers before stacking the plurality of laminate layers.

6. The method according to claim 5, further comprising cold pressing the plurality of laminate layers before resistive heating the stack of the plurality of laminate layers.

7. The method according to claim 5, further comprising mixing the bonding agent before spreading the bonding agent on the one or more of the plurality of laminate layers.

8. The method according to claim 7, wherein mixing the bonding agent includes determining an amount of water in the bonding agent based on a moisture content of the plurality of laminate layers.

9. The method according to claim 7, wherein mixing the bonding agent includes mixing a permeating agent with the adhesive, the permeating agent which improves permeation of adhesive and moisture into the plurality of laminate layers.

10. The method according to claim 7, wherein mixing the bonding agent includes adding an adhesive having greater than 16 percent Urea.

11. The method according to claim 7, wherein mixing the bonding agent includes adding an adhesive having 50 percent or less water.

12. The method according to claim 7, wherein mixing the bonding agent includes adding an adhesive having less than 31 percent formaldehyde.

13. A method of forming an engineered veneer block, the method comprising:
   stacking a plurality of laminate layers to form a veneer stack, the veneer stack having a topmost surface and a bottommost surface opposite the topmost surface; and
   transmitting electrical energy from the bottommost surface to the topmost surface or from the topmost surface to the bottommost surface such that the electrical energy passes through an entire thickness of each laminate layer of the stack of the plurality of laminate layers between the topmost surface and the bottommost surface to resistively heat the veneer stack to cure an adhesive in the plurality of laminate layers, the electrical energy from the bottommost surface to the topmost surface or from the topmost surface to the bottommost surface such that the electrical energy is distributed across the entire topmost surface or the entire bottommost surface.

14. The method according to claim 13, further comprising:
   contacting the entire topmost surface with a first conductor, the first conductor configured to distribute the electrical energy across the entire topmost surface; and
   contacting the entire bottom most surface with a second conductor, the second conductor configured to distribute the electrical energy across the entire bottommost surface.

15. The method according to claim 14, wherein transmitting electrical energy from the bottommost surface to the topmost surface or from the topmost surface to the bottommost surface includes connecting each of the first conductor and the second conductor to a power source at multiple locations along a respective edge of each of the first conductor and the second conductor.

16. The method according to claim 13, wherein stacking the plurality of laminate layers includes stacking a number of laminate layers in a range of 1600 laminate layers to 1900 laminate layers.

17. The method according to claim 13, wherein stacking the plurality of laminate layers includes stacking a number of laminate layers such that a height of the stack is in a range of 1200 millimeters to 1400 millimeters.

18. The method according to claim 13, wherein stacking the plurality of laminate layers to form the veneer stack includes each laminate layer having a thickness in a range of 0.085 mm to 1 mm.

19. The method according to claim 18, further comprising spreading a bonding agent on one or more of the plurality of laminate layers before stacking the plurality of laminate layers.

20. The method according to claim 19, further comprising cold pressing the plurality of laminate layers at a pressure in a range of 800 kPa to 5000 kPa for a duration in a range of 3 hours to 6 hours before resistive heating the stack of the plurality of laminate layers.

* * * * *